(12) United States Patent
Seo

(10) Patent No.: US 8,724,036 B2
(45) Date of Patent: May 13, 2014

(54) BROADCASTING SIGNAL RECEIVING APPARATUS, REMOTE CONTROLLER AND PAIRING METHOD THEREOF

(71) Applicant: Samsung Electronics Co., Ltd., Gyeonggi-do (KR)

(72) Inventor: Je-hwan Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/948,047

(22) Filed: Jul. 22, 2013

(65) Prior Publication Data

US 2013/0300945 A1     Nov. 14, 2013

Related U.S. Application Data

(63) Continuation of application No. 12/646,713, filed on Dec. 23, 2009, now Pat. No. 8,514,336.

(30) Foreign Application Priority Data

Apr. 20, 2009 (KR) .................. 10-2009-0034241

(51) Int. Cl.
*H04N 5/44* (2011.01)
*G05B 11/01* (2006.01)

(52) U.S. Cl.
USPC ....................................... 348/734; 340/12.24

(58) Field of Classification Search
USPC ............ 348/734, 552, 706; 340/12.22–12.24, 340/12.28, 12.29, 12.5, 12.52–12.54, 13.21, 340/13.24, 13.25, 13.31; 341/176
See application file for complete search history.

(56) References Cited

U.S. PATENT DOCUMENTS

| 5,341,166 A | 8/1994 | Garr et al. |
| 6,133,910 A | 10/2000 | Stinebrunner |
| 7,671,758 B1 | 3/2010 | Seidel et al. |
| 2003/0046579 A1 | 3/2003 | Hayes et al. |

(Continued)

FOREIGN PATENT DOCUMENTS

| EP | 1 947 621 A2 | 7/2008 |
| EP | 1940115 A2 | 7/2008 |

(Continued)

OTHER PUBLICATIONS

Partial European search Report dated Jun. 11, 2010, issued by the European Patent Office in counterpart Application No. 10151922.1-2202.

(Continued)

*Primary Examiner* — Victor Kostak
(74) *Attorney, Agent, or Firm* — Sughrue Mion, PLLC

(57) ABSTRACT

Disclosed are a broadcasting signal receiving apparatus, a remote controller and a pairing method thereof, the pairing method of the remote controller performing bidirectional communication with the broadcasting signal receiving apparatus and including: sensing a key input for a control instruction for controlling the broadcasting signal receiving apparatus, wherein the key input is selected from among a plurality of keys on the remote controller; transmitting a broadcasting signal to the broadcasting signal receiving apparatus, wherein the broadcasting signal corresponds to the key input and includes first identification information of the remote controller; and storing second identification information of the broadcasting signal receiving apparatus received from the broadcasting signal receiving apparatus. Thus, the identification information for performing the RF communication may be transmitted in response to a voluntary selection on the RF remote controller.

18 Claims, 9 Drawing Sheets

(56) References Cited

U.S. PATENT DOCUMENTS

| | | |
|---|---|---|
| 2004/0060977 A1* | 4/2004 | Proennecke .................. 235/375 |
| 2004/0080428 A1 | 4/2004 | Rye et al. |
| 2004/0189591 A1 | 9/2004 | Breuil |
| 2004/0233855 A1 | 11/2004 | Gutierrez et al. |
| 2004/0240395 A1* | 12/2004 | Gauthier et al. ............. 370/254 |
| 2005/0068151 A1 | 3/2005 | Ushida |
| 2006/0279430 A1 | 12/2006 | Arai |
| 2008/0044006 A1 | 2/2008 | Kitagawa |
| 2008/0076389 A1 | 3/2008 | Lee et al. |
| 2008/0143551 A1* | 6/2008 | Otsuka et al. ............ 340/825.69 |
| 2008/0169907 A1 | 7/2008 | Ootsuka |
| 2008/0198034 A1* | 8/2008 | Nakano .................... 340/825.22 |
| 2008/0248748 A1 | 10/2008 | Sangster et al. |
| 2009/0040016 A1 | 2/2009 | Ikeda |
| 2009/0045970 A1 | 2/2009 | Miyabayashi et al. |
| 2009/0051823 A1 | 2/2009 | Tsurumoto et al. |
| 2009/0092397 A1* | 4/2009 | Taguchi ........................ 398/106 |
| 2009/0195407 A1 | 8/2009 | Nakano et al. |
| 2009/0213278 A1 | 8/2009 | Tsurumoto et al. |
| 2009/0219174 A1* | 9/2009 | Kikuchi et al. ................. 341/20 |
| 2010/0013660 A1 | 1/2010 | Hwang et al. |
| 2010/0315279 A1 | 12/2010 | Hamai et al. |

FOREIGN PATENT DOCUMENTS

| | | |
|---|---|---|
| JP | 2007-67864 A | 3/2007 |
| JP | 2007-288476 A | 11/2007 |
| JP | 2008-177636 A | 7/2008 |
| JP | 2008-211706 A | 9/2008 |
| JP | 2009-027637 A | 2/2009 |
| JP | 2009-049590 A | 3/2009 |

OTHER PUBLICATIONS

European Search Report issued Jul. 12, 2011 in counterpart European Patent Application No. EP 10151922.1.

European Search Report issued Sep. 15, 2011 in divisional Application No. 11174927.1 of European Patent Application No. EP 10151922.1.

Communication (Extended European Search Report) dated Oct. 15, 2010 in counterpart EUropean Application No. 10151922.1.

Communication dated Dec. 17, 2013, issued by the Japanese Patent Office in counterpart Japanese Application No. 2010-087364.

Communication dated Feb. 18, 2014, issued by the European Patent Office in counterpart European Application No. 13177208.9.

\* cited by examiner

BROADCASTING SIGNAL RECEIVING APPARATUS, REMOTE CONTROLLER AND PAIRING METHOD THEREOF

CROSS-REFERENCE TO RELATED APPLICATION

This is a Continuation Application of U.S. patent application Ser. No. 12/646,713, filed Dec. 23, 2009, which claims priority from Korean Patent Application No. 10-2009-0034241, filed on Apr. 20, 2009 in the Korean Intellectual Property Office, the disclosures of which are incorporated herein by reference.

BACKGROUND OF INVENTION

1. Field of Invention

Apparatuses and methods consistent with the present invention relate to a broadcasting signal receiving apparatus, a remote controller and a pairing method thereof, and more particularly, to a broadcasting signal receiving apparatus, a remote controller and a pairing method thereof, in which bidirectional communication is performed on the basis of identification information.

2. Description of the Related Art

A broadcasting signal receiving apparatus receives a broadcasting signal from a broadcasting station, or receives an image signal from an external device such as a digital versatile disc (DVD) player or the like, and processes the received signal to be displayed as an image.

Such a broadcasting signal receiving apparatus is provided with a remote controller as an interface to receive user's instructions such as power on/off, channel selection, screen adjustment, volume control, reserved recording, etc.

In general, the remote controller includes a unidirectional communication unit such as an infrared communication module. The directional communication unit involves restrictions of a communicating direction, a communicating range, etc.

Accordingly, there has recently been an increased demand for a remote controller using a radio frequency (RF) signal supporting bidirectional (non-directional or Omni-directional) communication.

The remote controller using the RF signal requires pairing as a connection setup process for communication. The pairing is a process of storing a medial access control (MAC) address for RF communication between the broadcasting signal receiving apparatus and the RF remote controller.

For the pairing of the RF remote controller, a manual is usually provided to a user, and thus a user operates the RF remote controller on the basis of the provided manual to select a menu corresponding to a pairing mode and enter the pairing mode.

However, a user who has no background of the pairing for the RF remote controller may recognize that the foregoing paring process is complicated. Occasionally, it may be inconvenient for a user since the RF remote controller is not available when he/she cannot normally perform the paring.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An exemplary embodiment of the present invention provides a pairing method of a remote controller performing bidirectional communication with a broadcasting signal receiving apparatus, the pairing method may include: sensing a key input for a control instruction for controlling the broadcasting signal receiving apparatus, wherein the key input is selected from among a plurality of keys on the remote controller; transmitting a broadcasting signal to the broadcasting signal receiving apparatus, wherein the broadcasting signal corresponds to the key input and includes first identification information of the remote controller; and storing second identification information of the broadcasting signal receiving apparatus received from the broadcasting signal receiving apparatus.

According to an exemplary embodiment of the present invention, if the key input corresponds to a power-on/off key for the broadcasting signal receiving apparatus, the transmitting of the broadcast signal to the broadcasting signal receiving apparatus may include: transmitting a first broadcasting signal including the control instruction to the broadcasting signal receiving apparatus; and transmitting a second broadcasting signal including the first identification information to the broadcasting signal receiving apparatus.

According to an exemplary embodiment of the present invention, if the key input corresponds to a pairing key, the transmitting of the broadcast signal to the broadcasting signal receiving apparatus may include: transmitting a fourth broadcasting signal including the control instruction and the first identification information to the broadcasting signal receiving apparatus.

According to an exemplary embodiment of the present invention, if the key input corresponds to a key other than a power-on/off key for the broadcasting signal receiving apparatus and a pairing key, the transmitting of the broadcast signal to the broadcasting signal receiving apparatus may include: transmitting a third broadcasting signal including the first identification information to the broadcasting signal receiving apparatus; and transmitting a first unicast signal including the control instruction to the broadcasting signal receiving apparatus.

According to an exemplary embodiment of the present invention, the broadcasting signal may be transmitted to a plurality of transmission channels being monitored by the broadcasting signal receiving apparatus.

According to an exemplary embodiment of the present invention, the plurality of transmission channels may be in a band for wireless local area network (WLAN) channels.

According to an exemplary embodiment of the present invention, the broadcasting signal receiving apparatus may have a personal area network identifier (PAN ID) and the broadcasting signal may include the PAN ID of the broadcasting signal receiving apparatus.

According to an exemplary embodiment of the present invention, the plurality of keys includes at least one of a power-on/off key, a numeral key, a channel key, a menu key and a pairing key.

According to an exemplary embodiment of the present invention, the pairing method of the remote controller may further include notifying whether pairing is successful by outputting at least one of a sound through a speaker and a display on a display window.

Another exemplary embodiment of the present invention provides a pairing method of a broadcasting signal receiving apparatus performing bidirectional communication with a remote controller, and the pairing method may include: monitoring a plurality of transmission channels to determine whether a first broadcasting signal is received from the remote controller; performing a first function based on a control instruction included in the first broadcasting signal if the first broadcasting signal is received; storing first identification information if receiving from the remote controller a second broadcasting signal including the first identification information of the remote controller; and transmitting second identification information of the broadcasting signal receiving apparatus to the remote controller.

According to an exemplary embodiment of the present invention, the plurality of transmission channels may be in a band for wireless local area network (WLAN) channels.

According to an exemplary embodiment of the present invention, the monitoring of the plurality of transmission channels may be performed to determine whether the broadcasting signal is received comprises periodically measuring a power of a signal related to the plurality of transmission channels by standby power if the broadcasting signal receiving apparatus is in a power-off state.

Another exemplary embodiment of the present invention provides a remote controller which may include: a communication unit which bidirectionally communicates with a broadcasting signal receiving apparatus; a user input unit which includes a plurality of function keys; a storage unit which stores first identification information of the remote controller; and a controller which transmits to the broadcasting signal receiving apparatus a broadcasting signal including a control instruction corresponding to a key input and the first identification information, controls the communication unit to receive second identification information from the broadcasting signal receiving apparatus, and stores the received second identification information in the storage unit.

According to an exemplary embodiment of the present invention, if the key input corresponds to a power-on/off key for the broadcasting signal receiving apparatus, the transmitting of the broadcasting signal by the controller may include transmitting a first broadcasting signal including the control instruction to the broadcasting signal receiving apparatus and transmitting a second broadcasting signal including the first identification information to the broadcasting signal receiving apparatus.

According to an exemplary embodiment of the present invention, if the key input corresponds to a pairing key, the transmitting of the broadcasting signal by the controller may include transmitting a fourth broadcasting signal including the control instruction and the first identification information to the broadcasting signal receiving apparatus.

According to an exemplary embodiment of the present invention, if the key input corresponds to a key other than a power-on/off key for the broadcasting signal receiving apparatus and a pairing key, the transmitting of the broadcasting signal by the controller may include transmitting a third broadcasting signal including the first identification information to the broadcasting signal receiving apparatus and transmitting a first unicast signal including the control instruction to the broadcasting signal receiving apparatus.

According to an exemplary embodiment of the present invention, the transmitting of the broadcasting signal by the controller may include transmitting the broadcasting signal to a plurality of transmission channels being monitored by the broadcasting signal receiving apparatus.

According to an exemplary embodiment of the present invention, the plurality of transmission channels may be in a band for wireless local area network (WLAN) channels.

According to an exemplary embodiment of the present invention, the broadcasting signal receiving apparatus may have a personal area network identifier (PAN ID), and the transmitting of the broadcasting signal may include transmitting the PAN ID of the broadcasting signal receiving apparatus.

According to an exemplary embodiment of the present invention, the plurality of keys may include at least one of a power-on/off key, a numeral key, a channel key, a menu key and a pairing key.

According to an exemplary embodiment of the present invention, the remote controller may further include: a sound output unit; and a display unit having a display window, wherein the controller notifies whether pairing is successful by outputting at least one of a sounds through the sound output unit and a display on the display unit.

Another exemplary embodiment of the present invention provides a broadcasting signal receiving apparatus which may include: a communication unit which bidirectionally communicates with a remote controller; a storage unit which stores second identification information of the broadcasting signal receiving apparatus; and a controller which monitors whether a first broadcasting signal is received over any of a plurality of transmission channels, performs a first function based on a control instruction included in the first broadcasting signal if the first broadcasting signal is received, stores first identification information in the storage unit if receiving a second broadcasting signal including the first identification information of the remote controller from the remote controller, and controls the communication unit to transmit the second identification information of the broadcasting signal receiving apparatus to the remote controller.

According to an exemplary embodiment of the present invention, the plurality of transmission channels may be in a band for wireless local area network (WLAN) channels.

According to an exemplary embodiment of the present invention, the monitoring of whether the broadcasting signal is received may include periodically measuring a power of a signal related to the plurality of transmission channels by standby power if the broadcasting signal receiving apparatus is in a power-off state.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Below, exemplary embodiments of the present invention will be described in more detail with reference to accompanying drawings.

Figure 1:
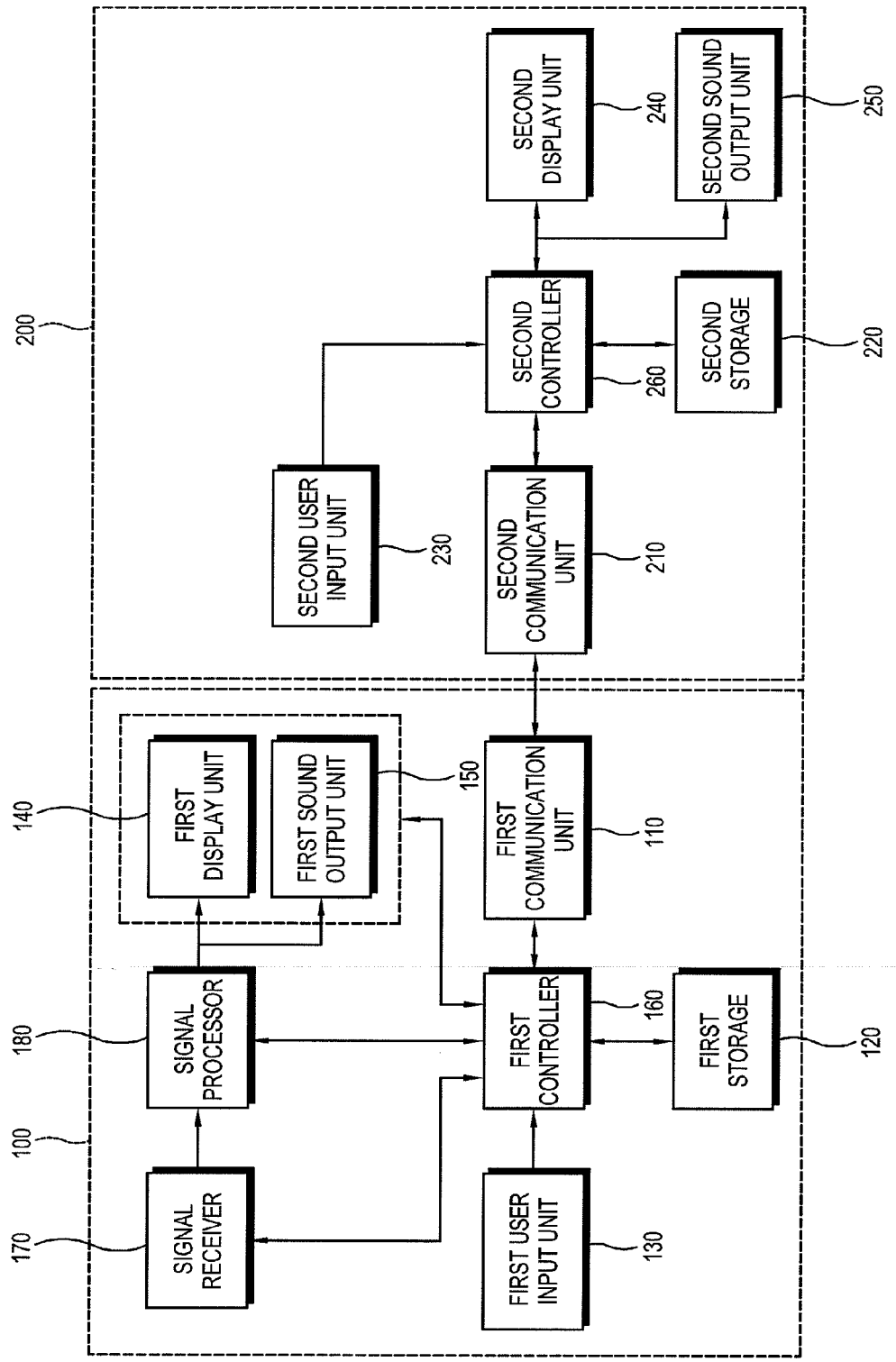
FIG. 1 is a block diagram of a broadcasting signal receiving apparatus and a remote controller according to an exemplary embodiment of the present invention.

FIG. 1 is a block diagram of a broadcasting signal receiving apparatus 100 and a remote controller 200 according to an exemplary embodiment of the present invention.

The broadcasting signal receiving apparatus 100 in this embodiment may be achieved by a digital television (TV), a set-top box, etc. The remote controller 200 bidirectionally communicates with the broadcasting signal receiving apparatus 100 and outputs a control signal for controlling an operation of the broadcasting signal receiving apparatus 100.

The broadcasting signal receiving apparatus 100 receives a control instruction corresponding to a predetermined function from the remote controller 200 through bidirectional (non-directional or Omni-directional) radio frequency (RF) communication. Here, the broadcasting signal receiving apparatus 100 and the remote controller 200 may operate as within a relationship between a master and a slave.

As shown in FIG. 1, the broadcasting signal receiving apparatus 100 includes a first communication unit 110, a first storage unit 120, a first user input unit 130, a first display unit 140, a first sound output unit 150, and a first controller 160.

According to the present exemplary embodiment, the broadcasting signal receiving apparatus 100 may include a signal receiver 170 to receive a broadcasting signal from a broadcasting station or an image signal from an external device such as a DVD player or the like, and a signal processor 180 to process the received image signal into a signal having a format displayable in the first display unit 140. The signal processor 180 divides the received broadcasting signal into a video signal, an audio signal, various additional signals, etc., and decodes the divided audio signal into a signal to be output in the first sound output unit 150.

The first communication unit 110 is a communication module providing a bidirectional (non-directional or Omni-directional) communication means, which communicates with the remote controller 200 through a communication system based on a predetermined communication standard.

The first communication unit 110 communicates with the corresponding remote controller 200 under control of the first controller 160 on the basis of predetermined identification information. The first communication unit 110 of the broadcasting signal receiving apparatus 100 may be achieved by an RF communication module, e.g., a ZigBee communication module using a band of 2.4 GHz, which receives a media access control (MAC) address as the identification information (hereinafter referred to as "first identification information") of the remote controller 200, and performs RF communication with the remote controller 200 on the basis of the received MAC address.

Meanwhile, the first communication unit 110 is capable of communicating with the remote controller 200 through a broadcasting signal corresponding to at least one preset channel in the state that the first identification information of the remote controller 200 is not received.

Here, the broadcasting signal is defined by 802.15.4 standard. Using this broadcasting signal, it is possible to send a control signal from a transmitter to a receiver if personal area network identifiers (PAN ID) thereof are matched with each other even though the transmitter and a receiver do not receive any MAC address from each other.

Specifically, the broadcasting signal transmitted from the remote controller 200 to the broadcasting signal receiving apparatus 100 includes a frame of a predetermined format, in which the frame has a PAN ID field expressing the PAN ID of the remote controller 200.

For example, if the broadcasting signal receiving apparatus 100 in this embodiment receives the broadcasting signal having "0xffff" as a field value of the PAN ID, it may be determined whether the received field value is matched with the PAN ID of the broadcasting signal receiving apparatus 100. If the field value of the PAN ID of the received broadcasting signal is matched with the PAN ID of the broadcasting signal receiving apparatus 100, the broadcasting signal receiving apparatus 100 normally receives the corresponding broadcasting signal.

The remote controller 200 in this embodiment may use broadcasting signals corresponding to three channels of No. (2425 MHz), No. 20 (2450 MHz) and No. 25 (2475 MHz) to transmit the first identification information, i.e., the MAC address thereof to the broadcasting signal receiving apparatus 100.

The broadcasting signal receiving apparatus 100 monitors a plurality of transmission channels formed in a band for wireless local area network (WLAN) channels, receives at least one of the broadcasting signals from the remote controller 200, and identifies the MAC address included in the received broadcasting signal. Here, the plurality of transmission channels may correspond to the channel Nos. 15, 20 and 25.

Here, the broadcasting signal receiving apparatus 100 measures power of the transmission channels being monitored regardless of whether it is powered on/off, and senses the broadcasting signal. In the case that the broadcasting signal receiving apparatus 100 is powered off, standby power is used for periodically measuring power of signals related to the plurality of transmission channels.

According to the first exemplary embodiment, the broadcasting signal includes a first broadcasting signal including a control instruction for one of the functions of the broadcasting receiving apparatus 100, and a second broadcasting signal including the first identification information of the remote controller 200. The first broadcasting signal may include a control instruction corresponding to a power-on of the broadcasting signal receiving apparatus 100.

Figure 2:
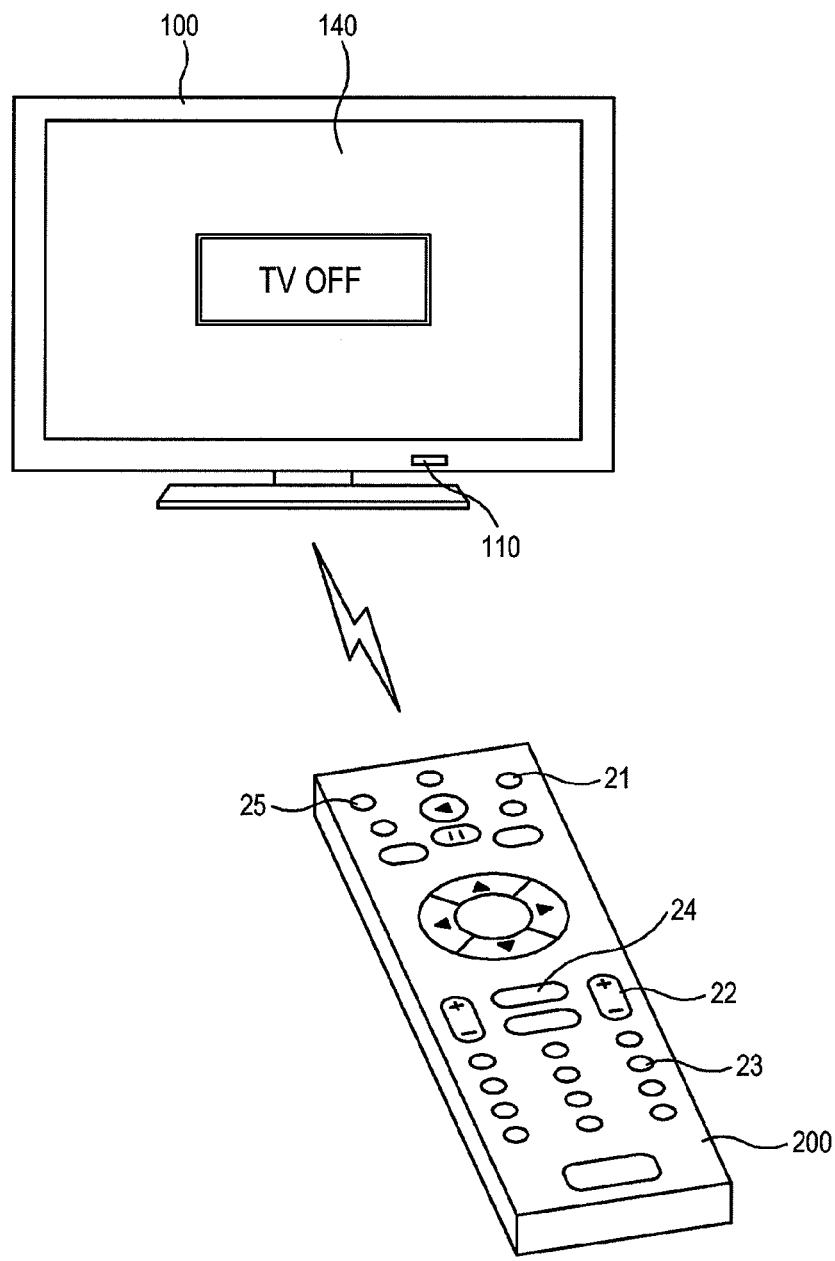
FIGS. 2 and 3 are views for explaining a pairing process using a power-on signal according to a first exemplary embodiment of the present invention.
Figure 3:
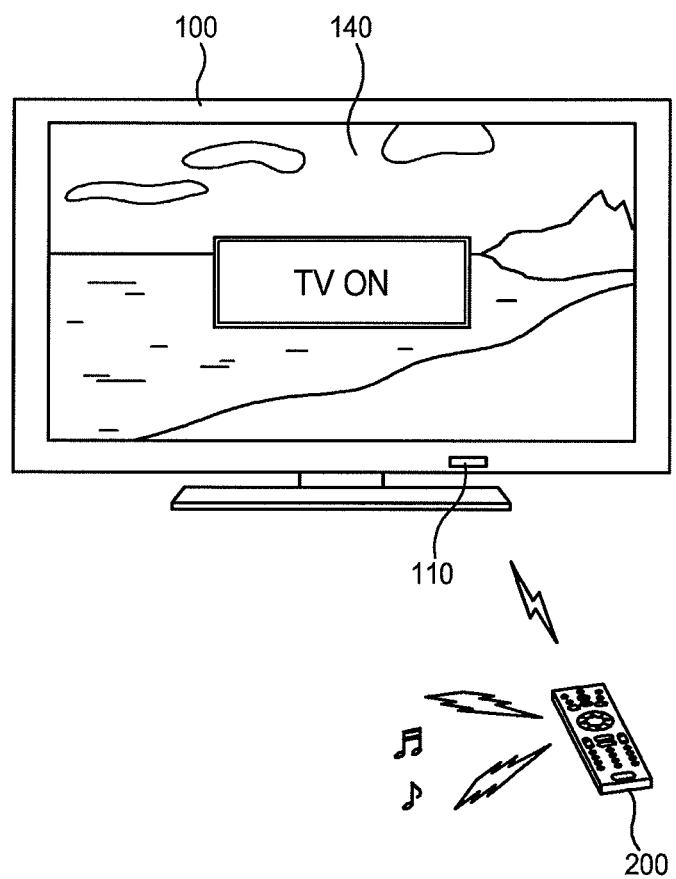

FIGS. 2 and 3 are views for explaining a pairing process using a power-on signal according to a first exemplary embodiment of the present invention.

As shown in FIG. 2, the remote controller 200 may include a power-on/off key 21, numeral keys 23, a channel key 22, a menu key 24 and a pairing key 25. A user may manipulate the power-on/off key 21, with the remote controller 200 to watch a TV while the broadcasting signal receiving apparatus 100 is powered off, thereby inputting an instruction to turn on the broadcasting signal receiving apparatus 100.

Thus, the remote controller 200 transmits the first broadcasting signal including a power-on instruction and the second broadcasting signal including the first identification information of the remote controller 200 to the broadcasting signal receiving apparatus 100 in sequence.

At this time, the broadcasting signal receiving apparatus 100 being in the power-off state performs monitoring, i.e., periodically measures the power of the signal related to the plurality of transmission channels by the standby power, and senses the first and second broadcasting signals from the remote controller 200.

As shown in FIG. 3, the first controller 160 turns on the broadcasting signal receiving apparatus 100 on the basis of the power-on instruction included in the received first broadcasting signal, and controls the first storage unit 120 to store the first identification information of the remote controller 200, included in the received second broadcasting signal. Further, the first controller 160 transmits second identification information of the broadcasting signal receiving apparatus 100 to the remote controller 200, thereby performing pairing for the RF communication.

Correspondingly, the remote controller 200 receives and stores the second identification information of the broadcasting signal receiving apparatus 100, thereby performing the paring with the broadcasting signal receiving apparatus 100. The remote controller 200 may notify a user of pairing success through at least one of a second display unit 240 and a second sound output unit 250 (to be described later with reference to FIG. 3) when storing the second identification information and thus completing the paring.

Also, the broadcasting signal receiving apparatus 100 may notify a user of the pairing success through at least one of the first display unit 140 and the first sound output unit 150 (to be described later with reference to FIG. 4) when storing the first identification information and thus completing the pairing.

The first storage unit 120 stores the first identification information of the remote controller 200, received through the first communication unit 110 under control of the first controller 160. The first storage unit 120 may be achieved by a non-volatile memory such as an erasable programmable read-only memory (EPROM), a flash memory, a hard disk drive (HDD), etc.

Meanwhile, the first storage unit 120 may store the PAN ID of the broadcasting signal receiving apparatus 100.

Thus, the first controller 160 can normally receive the broadcasting signal with the first identification information of the remote controller 200 through the first communication unit 110 if the PAN ID of the corresponding remote controller 200 is matched with the PAN ID of the broadcasting signal receiving apparatus 100, stored in the first storage unit 120.

As a user interface receives instructions from a user, the first user input unit 130 receives a user's selection about the function or the operation of the broadcasting signal receiving apparatus 100.

The first user input unit 130 may have at least one key button as a hot key, and achieved by a control panel provided in the broadcasting signal receiving apparatus 100. The first user input unit 130 may include the minimum buttons such as the power-on/off key, a menu key, directional keys, etc. The first controller 160 determines that a user's instruction is input, when sensing a key input of the control panel.

The first display unit 140 includes a display window to display an image, and displays an image processed by the signal processor 180. When the pairing for the RF communication with the remote controller 200 is normally completed under the control of the first controller 160, the first display unit 140 may display a message for notifying a user of the paring completion as shown in FIG. 4.

Figure 4:
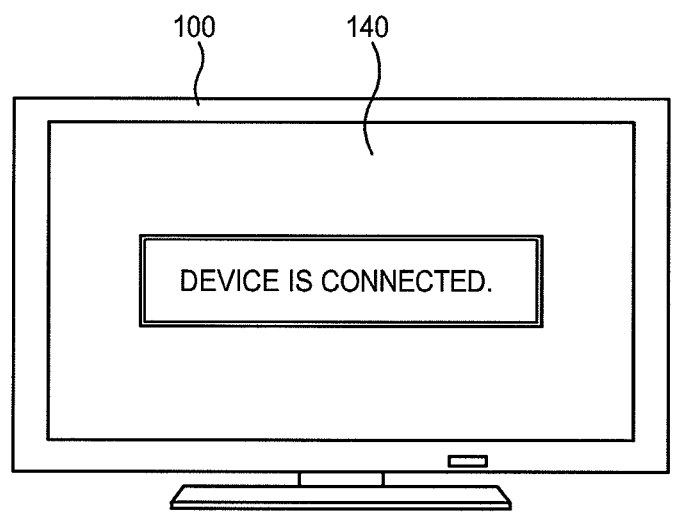
FIGS. 4 and 5 are views showing messages displayed as the pairing process is performed according to a second exemplary embodiment of the present invention.
Figure 5:
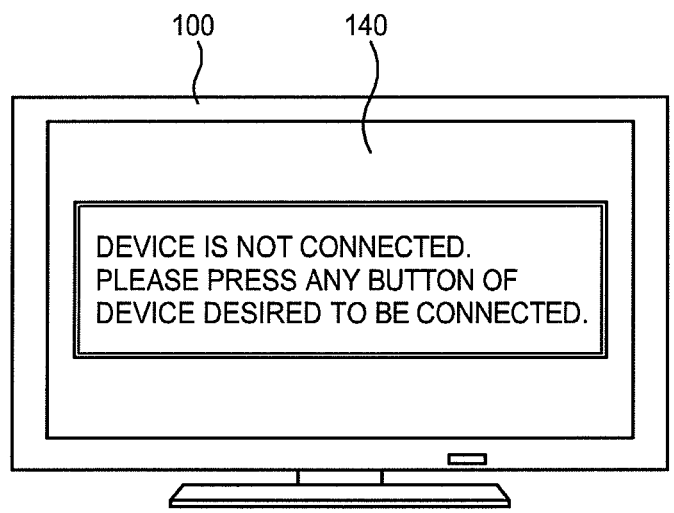

FIGS. 4 and 5 are views showing messages displayed as the pairing process is performed according to a second exemplary embodiment of the present invention. The message shown in FIG. 5 will be described in more detail with regard to a pairing operation between the remote controller 200 and the broadcasting signal receiving apparatus 100 according to a second exemplary embodiment to be described later.

Meanwhile, the first display unit 140 may display a message or the like to a user when the pairing with the remote controller 200 is failed, communication is disconnected, connection is retried, or etc.

The first display unit 140 may be achieved by various display modules such as a digital light processing (DLP), a liquid crystal display (LCD), a plasma display panel (PDP), etc. Further, the video signal is processed by the signal processor 180 to be adapted to an output standard such as a vertical frequency, a resolution, an aspect ratio, etc. of the first display unit 140.

The first sound output unit 150 may be achieved by a speaker or the like, and outputs an audio signal decoded by the signal processor 180.

The first sound output unit 150 of the broadcasting signal receiving apparatus 100 may output a sound (e.g., a buzz) about that the pairing with the remote controller 200 is completed, failed, retried, etc. to a user.

The first controller 160 performs general control of the broadcasting signal receiving apparatus 100. Specifically, the first controller 160 receives the broadcasting signal including the identification information of the remote controller 200 through the first communication unit 110, and performs the paring by storing the received the identification information in the first storage unit 120. Also, the first controller 160 controls the first communication unit 110 to transmit the identification information of the broadcasting signal receiving apparatus 100 to the remote controller 200.

In more detail, the first controller 160 receives the broadcasting signal from the remote controller 200 of which the PAN ID is matched, thereby entering a pairing mode. The first controller 160 stores the identification information of the remote controller 200, included in the received broadcasting signal, in the first storage unit 120, and transmits the identification information of the broadcasting signal receiving apparatus 100 to the remote controller 200 through the first communication unit 110. If the remote controller 200 stores the received identification information of the broadcasting signal receiving apparatus 100, the paring between the broadcasting signal receiving apparatus 100 and the remote controller 200 is completed.

When the pairing is completed, the first controller 160 may output the message about the paring completion through at least one of the first display unit 140 and the first sound output unit 150.

According to the second exemplary embodiment of the present invention, the broadcasting signal receiving apparatus 100 may receive the broadcasting signal including the first identification information from the remote controller 200 during the power-on state.

Specifically, a user may input an instruction by manipulating not the power-on/off key but another function key (e.g., one of a numeral key, a channel key and a menu key) of the remote controller 200, thereby making the broadcasting signal receiving apparatus 100 perform a predetermined function.

Thus, the remote controller 200 transmits a third broadcasting signal including the first identification information of the remote controller 200 to the broadcasting signal receiving apparatus 100. The first controller 160 receives the third broadcasting signal through the first communication unit 110, and stores the first identification information in the first storage unit 120. Further, the first controller 160 transmits the second identification information of the broadcasting signal receiving apparatus 100 to the remote controller 200.

The remote controller 200 receives and stores the second identification information from the broadcasting signal receiving apparatus 100 to thereby perform the pairing, and transmits a first unicast signal including a control instruction corresponding to the function key input by a user to the broadcasting signal receiving apparatus 100. Then, the broadcasting signal receiving apparatus 100 performs a function corresponding to the control instruction included in the received first unicast signal.

If the pairing according to the second exemplary embodiment is completed, the remote controller 200 or the broadcasting signal receiving apparatus 100 may notify a user of whether the pairing is successful, through at least one of the display unit 140, 240 and the sound output unit 150, 250.

Here, the broadcasting signal receiving apparatus 100 in the second exemplary embodiment may receive an power-on instruction from a user through the first user input unit 130.

The first controller 160 turns on the broadcasting signal receiving apparatus 100 if the power-on instruction is input through the first user input unit 130, and controls the first display unit 140 to display a message of requesting a user to input an instruction through the remote controller 200 (refer to FIG. 5) for the purpose of the pairing for the RF communication with the remote controller 200.

Then, a user manipulates the function key of the remote controller 200 in response to the message on the first display unit 140, so that the remote controller 200 transmits the third broadcasting signal including the identification information and the unicast signal corresponding to the manipulated function key to the broadcasting signal receiving apparatus 100.

Here, the unicast signal transmitted to the broadcasting signal receiving apparatus 100 may contain a user's various control instructions such as channel selection, screen adjustment, volume control, reserved recording, etc.

The first controller 160 may control the first sound output unit 150 to output a sound of requesting a user to input an instruction through the remote controller 200.

The first controller 160 may be achieved by a corresponding software program, and a processor such as a microcomputer, a central processing unit (CPU), etc. for loading and executing the program.

According to a third exemplary embodiment of the present invention, the broadcasting signal receiving apparatus 100 may receive a fourth broadcasting signal including a control instruction for performing the pairing and the first identification information during the power-on or -off state if a user manipulates a pairing key of the remote controller 200. The first controller 160 receives the fourth broadcasting signal and stores the first identification information in the first storage unit 120 to thereby perform the pairing, and controls the first communication unit 110 to transmit the second identification information of the broadcasting signal receiving apparatus 100 to the remote controller 200.

Meanwhile, as shown in FIG. 1, the remote controller 200 includes a second communication unit 210, a second storage unit 220, a second user input unit 230, the second display unit 240, the second sound output unit 250 and a second controller 260.

The remote controller 200 may transmit the broadcasting signal for the paring with the broadcasting signal receiving apparatus 100 regardless of whether the broadcasting signal receiving apparatus 100 is powered on or off.

The second communication unit 210 is a communication module providing a bidirectional (non-directional or Omnidirectional) communication means, which communicates with the broadcasting signal receiving apparatus 100 through a communication system based on a predetermined communication standard.

The second communication unit 210 communicates with the corresponding broadcasting signal receiving apparatus 100 under control of the second controller 260 on the basis of predetermined identification information. The second communication unit 210 of the remote controller 200 may be achieved by an RF communication module, e.g., a ZigBee communication module using a band of 2.4 GHz, which receives a media access control (MAC) address as the identification information (hereinafter, referred to as "second identification information") of the broadcasting signal receiving apparatus 100, and performs RF communication with the broadcasting signal receiving apparatus 100 on the basis of the received MAC address.

Meanwhile, the second communication unit 210 is capable of communicating with the broadcasting signal receiving apparatus 100 through a broadcasting signal corresponding to at least one preset channel in the state that the second identification information of the broadcasting signal receiving apparatus 100 is not received.

Here, the broadcasting signal is defined by 802.15.4 standard. Using this broadcasting signal, it is possible to transmit a signal between a transmitter and a receiver through the same preset channel if personal areal network identifiers (PAN ID) thereof are matched with each other even though the transmitter and a receiver do not receive any MAC address from each other.

The second communication unit 210 in this embodiment may use broadcasting signals corresponding to three channels of No. 15 (2425 MHz), No. 20 (2450 MHz) and No. 25 (2475 MHz) to transmit the first identification information, i.e., the MAC address of the remote controller 200 to the broadcasting signal receiving apparatus 100.

Here, the second controller 260 of the remote controller 200 senses a key input from the second user input unit 230 (to be described later), selectively uses the broadcasting signal for a control instruction of a function corresponding to the sensed key input to thereby transmit the control instruction to the broadcasting signal receiving apparatus 100, and uses the broadcasting signal to transmit the first identification information of the remote controller 200 to the broadcasting signal receiving apparatus 100.

Specifically, according to the first exemplary embodiment of the present invention, if the key input sensed by the remote controller 200 is related to the power-on/off of the broadcasting signal receiving apparatus 100, the second controller 260 may control the second communication unit 210 to transmit the first broadcasting signal including the power-on instruction and the second broadcasting signal including the first identification information to the broadcasting signal receiving apparatus 100 in sequence.

Further, the broadcasting signal receiving apparatus 100 may receive a predetermined control instruction from the remote controller 200 during the power-on state. That is, according to the second exemplary embodiment, if the key input sensed by the remote controller 200 is related to a menu key for general controls except the power-on/off key for the broadcasting signal receiving apparatus 100, the second controller 260 may control the second communication unit 210 to transmit the third broadcasting signal including the first identification information and the first unicast signal including the control instruction corresponding to the sensed key input to the broadcasting signal receiving apparatus 100 in sequence. Here, the first unicast signal may include various control instructions such as the channel selection, volume control, etc. through the remote controller 200.

According to the third exemplary embodiment of the present invention, the key input sensed by the remote controller 200 may be related to a pairing key corresponding to an instruction for pairing with the broadcasting signal receiving apparatus 100. Thus, if the key input sensed by the remote controller 200 is related to the pairing key, the second controller 260 controls the second communication unit 210 to transmit the fourth broadcasting signal including the first identification information and the control instruction for the pairing to the broadcasting signal receiving apparatus 100.

In this embodiment, the foregoing broadcasting signals (including the first broadcasting signal, the second broadcasting signal, the third broadcasting signal and the fourth broadcasting signal) are transmitted to the plurality of transmission channels (e.g., channels No. 15 (2425 MHz), No. 20 (2450 MHz) and No. 25 (2475 MHz)) to be monitored by the broadcasting signal receiving apparatus 100, and the plurality of transmission channels are formed in a band (e.g., 2.4 GHz) for wireless local area network (WLAN) channels.

Further, the broadcasting signal transmitted from the remote controller 200 to the broadcasting signal receiving apparatus 100 includes a frame of a predetermined format, which includes a PAN ID field (e.g., "0xffff") as the PAN ID of the remote controller 200. The PAN ID included in the broadcasting signal is equal to the PAN ID of the corresponding broadcasting signal receiving apparatus 100.

The second controller 260 enters a pairing mode with the corresponding broadcasting signal receiving apparatus 100 while transmitting the broadcasting signal including the first identification information through the second communication unit 210.

Further, the second controller 260 receives the second identification information from the broadcasting signal receiving apparatus 100 through the second communication unit 210, and stores the received second identification information of the broadcasting signal receiving apparatus 100 in the second storage unit 220, thereby completing the pairing.

The second storage unit 220 may be achieved by a nonvolatile memory such as an erasable programmable read-only memory (EPROM), a flash memory, a hard disk drive (HDD), etc., which may further store the PAN ID of the remote controller 200.

As a user interface for receiving instructions of a user, the second user input unit 230 receives a user's selection about the operation of the broadcasting signal receiving apparatus 100.

The second user input unit 230 may be achieved by a control panel having at least one button as a hot key. The second user input unit 230 may include key buttons such as a power-on/off key, a numeral key, a channel key, a menu key, a reserved recording key, a paring key, etc. The second controller 260 determines that a user's instruction is input, when the button of the control panel is pressed.

The second user input unit 230 may include a graphic user interface (GUI) generated by executing a predetermined application and displayable on the second display unit 240 to thereby allow a user's input.

The second display unit 240 includes a display window, and displays a message about the RF communication between the remote controller 200 and the broadcasting signal receiving apparatus 100. When the pairing for the RF communication with the broadcasting signal receiving apparatus 100 is normally completed under the control of the second controller 260, the second display unit 240 may display a message for notifying a user of the paring completion.

The second display unit 240 may show a user a message about that the pairing with the remote controller 200 is failed, communication is disconnected, connection is retried, or etc.

The second display unit 240 may be achieved by a display module such as a liquid crystal display (LCD).

The second sound output unit 250 may be achieved by a loudness speaker or the like, and output a sound (e.g., a buzz) about that the pairing with the remote controller 200 is completed, failed, retried, or etc. to a user.

The second controller 260 performs general control of the remote controller 200. Specifically, the second controller 260 controls the second communication unit 210 to transmit the broadcasting signal including the first identification information of the remote controller 200 to the broadcasting signal receiving apparatus 100 in response to a user's voluntary selection using the second user input unit 230.

The remote controller 200 enters the pairing mode for the RF communication with the broadcasting signal receiving apparatus 100 while transmitting the first identification information.

In the pairing mode, the second controller 260 receives the second identification information of the broadcasting signal receiving apparatus 100 through the second communication unit 210. The second controller 260 stores the received identification information in the second storage unit 220, thereby completing the pairing.

When the paring between the remote controller 200 and the broadcasting signal receiving apparatus 100 is completed, the second controller 260 may control at least one of the second display unit 240 and the second sound output unit 250 to notify a user of the pairing completion.

The second controller 260 may be achieved by a corresponding software program, and a processor such as a microcomputer, a central processing unit (CPU), etc. for loading and executing the program.

Meanwhile, the foregoing pairing process is performed when the broadcasting signal receiving apparatus 100 and the remote controller 200 are first connected to each other. If the identification information of them has been stored in each other, the communication using the RF signal may be performed and controlled without a separate paring process.

Accordingly, the paring in this embodiment may be applied in the first operation after purchasing the broadcasting signal receiving apparatus 100 and the remote controller 200, when the remote controller 200 is replaced, etc.

Also, in this embodiment, the identification information of the remote controller 200 is transmitted through the broadcasting signal, but not limited thereto. Alternatively, the present inventive concept may be applied to not only the remote controller 200 but also various wireless interface devices such as a wireless keyboard, a wireless headphone, etc. which can wirelessly communicate with the broadcasting signal receiving apparatus 100.

Further, the RF communication in this embodiment may be applied to all communication apparatuses which performs wireless communication on the basis of not only the MAC address but also various identification information.

With this configuration, a pairing method between the broadcasting signal receiving apparatus 100 and the remote controller 200 will be described with reference to FIGS. 6 to 9.

Figure 6:
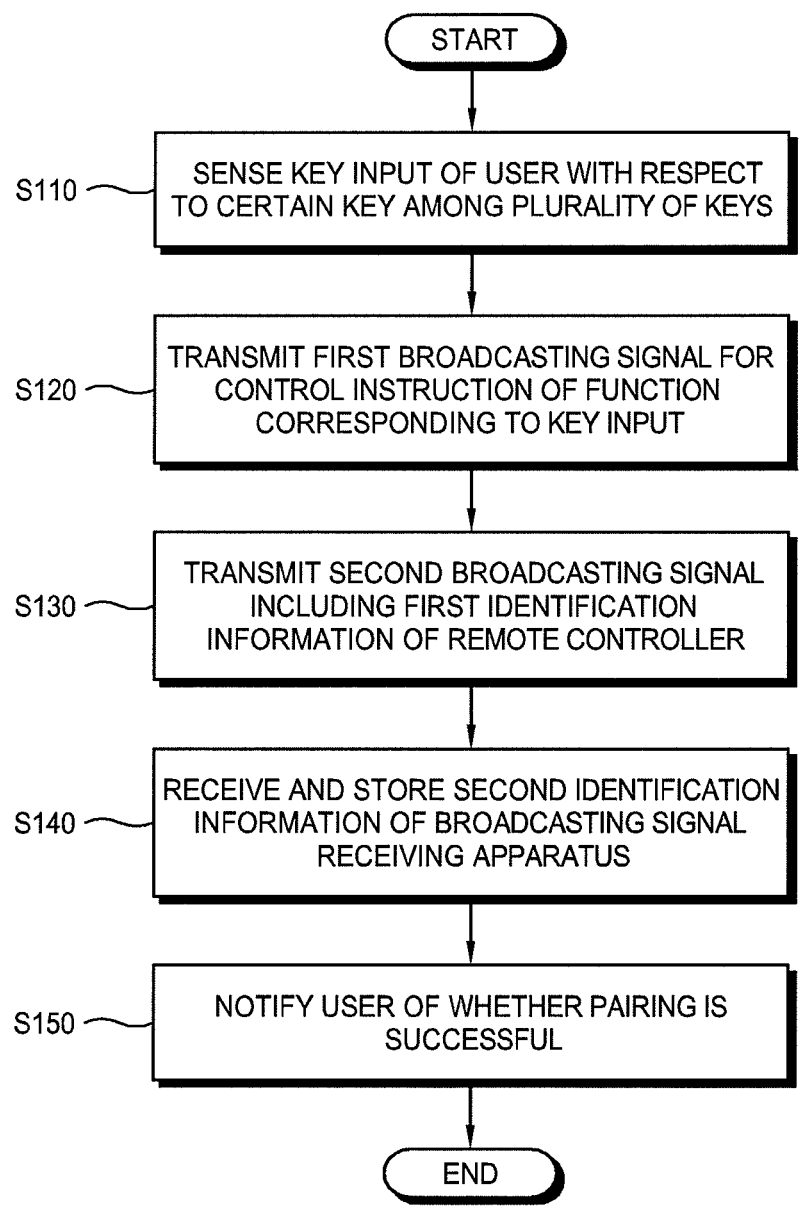
FIG. 6 is a flowchart of a pairing method for the remote controller according to the first exemplary embodiment of the present invention.
Figure 7:
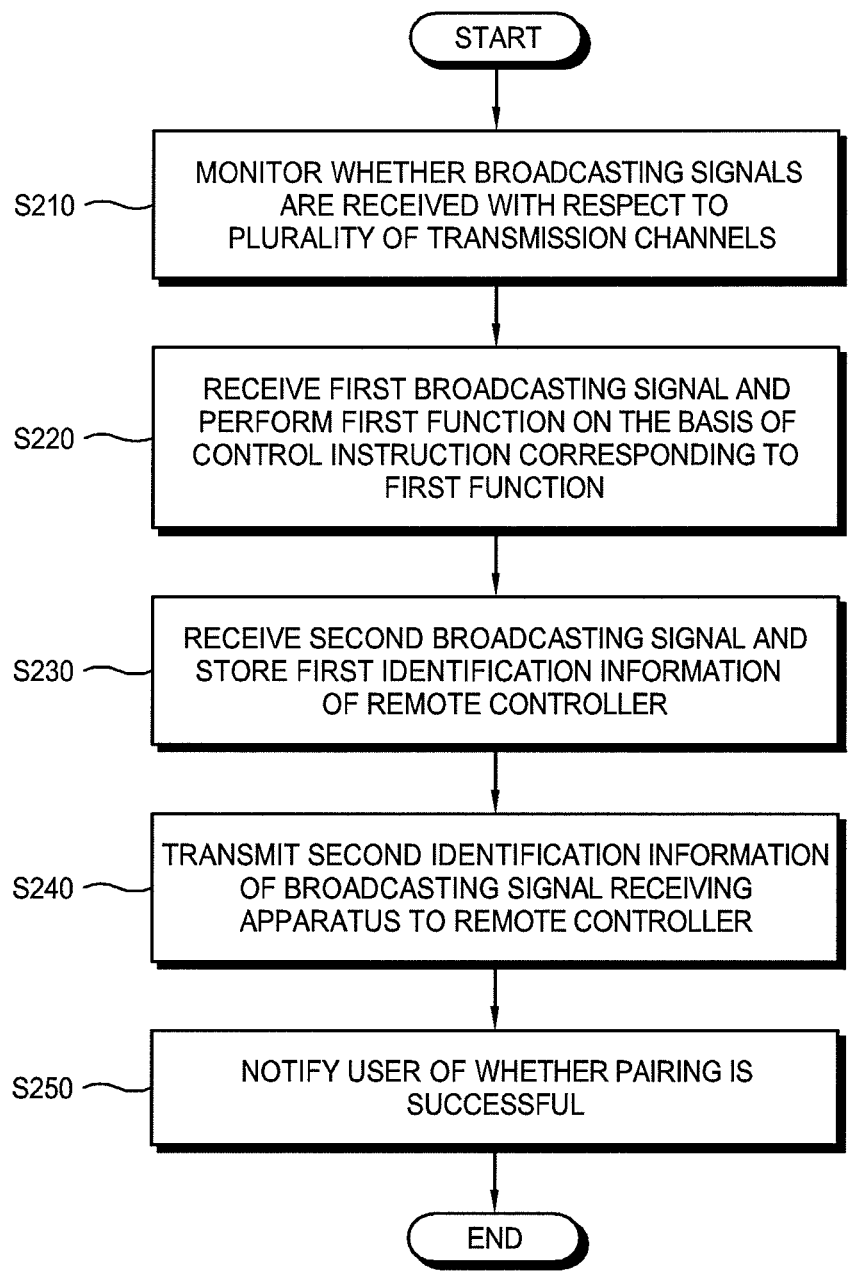
FIG. 7 is a flowchart of a pairing method for the broadcasting signal receiving apparatus according to the first exemplary embodiment of the present invention.

FIG. 6 is a flowchart of a pairing method for the remote controller according to the first exemplary embodiment of the present invention, and FIG. 7 is a flowchart of a pairing method for the broadcasting signal receiving apparatus according to the first exemplary embodiment of the present invention.

First, as shown in FIG. 6, at operation 5110, the remote controller 200 senses a key input of a user with regard to a certain key among a plurality of function keys of the second user input unit 230. Here, the remote controller 200 may sense the key input corresponding to the instruction for turning on the broadcasting signal receiving apparatus 100 during the power-off state of the broadcasting signal receiving apparatus 100.

At operation S120, the second controller 260 selectively uses the broadcasting signal, and transmits the first broadcasting signal, related to the control instruction of the function corresponding to the key input in the operation S110, to the broadcasting signal receiving apparatus 100. Here, the control instruction included in the first broadcasting signal may include the instruction for turning on the broadcasting signal receiving apparatus 100.

At operation S130, the second controller 260 transmits the second broadcasting signal including the first identification information of the remote controller 200 to the broadcasting signal receiving apparatus 100.

The first and second broadcasting signals transmitted in the operations S120 and S130 can be transmitted through the plurality of transmission channels being monitored by the broadcasting signal receiving apparatus 100, and the plurality of transmission channels may be formed in a band for the wireless LAN channels.

Further, the first and second broadcasting signals transmitted in the operations S120 and S130 may have a preset field value as the PAN ID equal to the PAN ID of the broadcasting signal receiving apparatus 100.

At operation S140, the second controller 260 receives the second identification information (MAC address) of the broadcasting signal receiving apparatus 100 through the second communication unit 210, and stores it in the second storage unit 220. When the storing operation is completed in the operation S140, the remote controller 200 successfully performs the pairing of setting up connection for the RF communication with the corresponding broadcasting signal receiving apparatus 100.

If the pairing is completed in the operations 5110 to S140, at operation S150 the second controller 260 may notify a user of whether the pairing is successful or not through at least one of the second display unit 240 and the second sound output unit 250.

Referring to FIG. 7, at operation S210 the broadcasting signal receiving apparatus 100 in the first exemplary embodiment monitors whether the broadcasting signals are received with respect to the plurality of transmission channels formed in a band for the wireless LAN channels. Here, if the broadcasting signal receiving apparatus 100 is in the power-off state, the first controller 160 uses the standby power to periodically measure the power of the signals related to the plurality of transmission channels, thereby monitoring whether the broadcasting signals are received.

As results from monitoring in the operation S210, at operation S220 the first controller 160 receives the first broadcasting signal including the control instruction about a first function of the broadcasting signal receiving apparatus 100, and performs the first function. For example, if the first function is to turn on the broadcasting signal receiving apparatus 100, the first controller 160 turns on the broadcasting signal receiving apparatus 100 being in the power-off state.

Further, as results from monitoring in the operation S210, at operation S230 the first controller 160 receives the second broadcasting signal including the first identification information of the remote controller 200 from the remote controller 200, and stores the first identification information in the first storage unit 120.

The first and second broadcasting signals received in the operations S220 and S230 may include the same PAN ID as the PAN ID of the broadcasting signal receiving apparatus 100. That is, the PAN ID of broadcasting signal receiving apparatus 100 is matched with the PAN ID of the remote controller 200, and thus the broadcasting signal of the same preset channel makes signal transmission possible between the broadcasting signal receiving apparatus 100 and the remote controller 200.

At operation S240, the first controller 160 transmits the second identification information of the broadcasting signal receiving apparatus 100 to the remote controller 200 through the first communication unit 110 in response to the first identification information received in the operation S230. Thus, the broadcasting signal receiving apparatus 100 may successfully perform the pairing of setting up the communication connection for the RF communication with the corresponding remote controller 200.

As results from performing the operations S220 to S240, at operation S250 the first controller 160 may notify a user of whether the pairing is successful or not through at least one of the first display unit 140 and the first sound output unit 150.

Accordingly, the broadcasting signal receiving apparatus 100 and the remote controller 200 are paired with each other through the signal transmission using the broadcasting signal of the same preset channel if the PAN IDs thereof are matched with each other.

Figure 8:
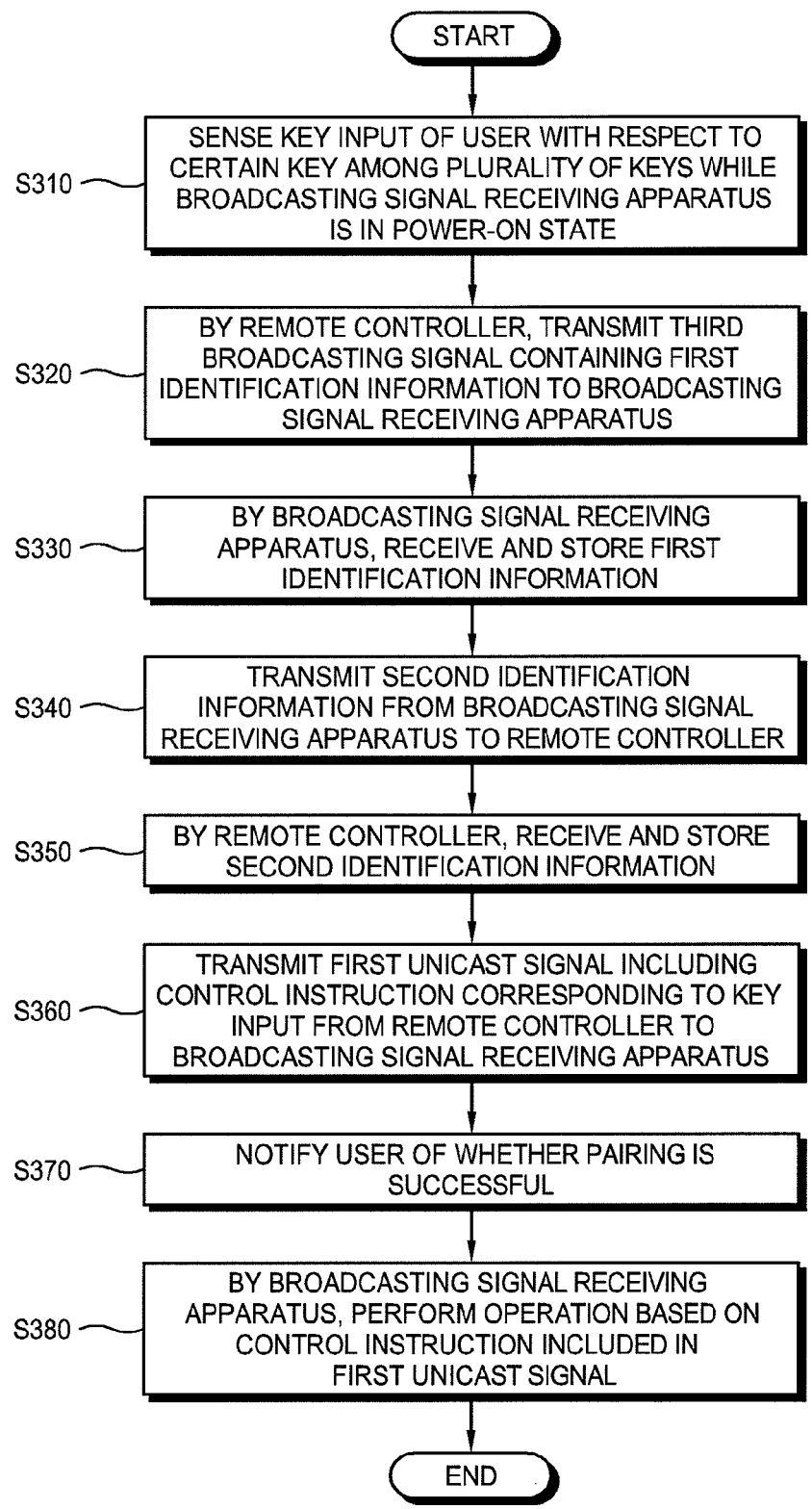
FIG. 8 is a flowchart of a pairing method for the broadcasting signal receiving apparatus and the remote controller according to the second exemplary embodiment of the present invention.

FIG. 8 is a flowchart of a pairing method for the broadcasting signal receiving apparatus 100 and the remote controller 200 according to the second exemplary embodiment of the present invention.

As shown in FIG. 8, at operation S310 the remote controller 200 may sense a user's key input corresponding to a certain key among the plurality of keys provided in the second user input unit 230 in the state that the broadcasting signal receiving apparatus 100 is in the power-on state. Besides the power-on/off key of the first exemplary embodiment and the pairing key of the third exemplary embodiment, the key input of a user may be to give a predetermined control instruction (e.g., a numeral key, a channel key, a menu key, etc.) with respect to the broadcasting signal receiving apparatus 100.

At operation S320, the remote controller 200 transmits the third broadcasting signal including the first identification information of the remote controller 200 to the broadcasting signal receiving apparatus 100 in response to the key input in the operation S310.

At operation S330, the broadcasting signal receiving apparatus 100 receives the third broadcasting signal transmitted in the operation S320 and stores the first identification information in the first storage unit 120 by monitoring whether the broadcasting signals corresponding to the plurality of transmission channels are received.

At operation S340, the broadcasting signal receiving apparatus 100 transmits the second identification information of the broadcasting signal receiving apparatus 100 to the remote controller 200 in response to the first identification information received in the operation S330.

At operation S350, the remote controller 200 receives the second identification information transmitted in the operation S340 and stores it in the second storage unit 220.

At operation S360, the remote controller 200 transmits the first unicast signal including a control instruction corresponding to the key input in the operation S310 to the broadcasting signal receiving apparatus 100.

As results from performing the operations S310 to S360, at operation S370 the broadcasting signal receiving apparatus 100 or the remote controller 200 may notify a user of whether the pairing is successful or not through a display window, a sound, etc.

At operation S380 the broadcasting signal receiving apparatus 100 receives the first unicast signal transmitted in the operation S360, and performs operation (e.g., volume control, channel selection, etc.) corresponding to the control instruction included in the received first unicast signal.

Figure 9:
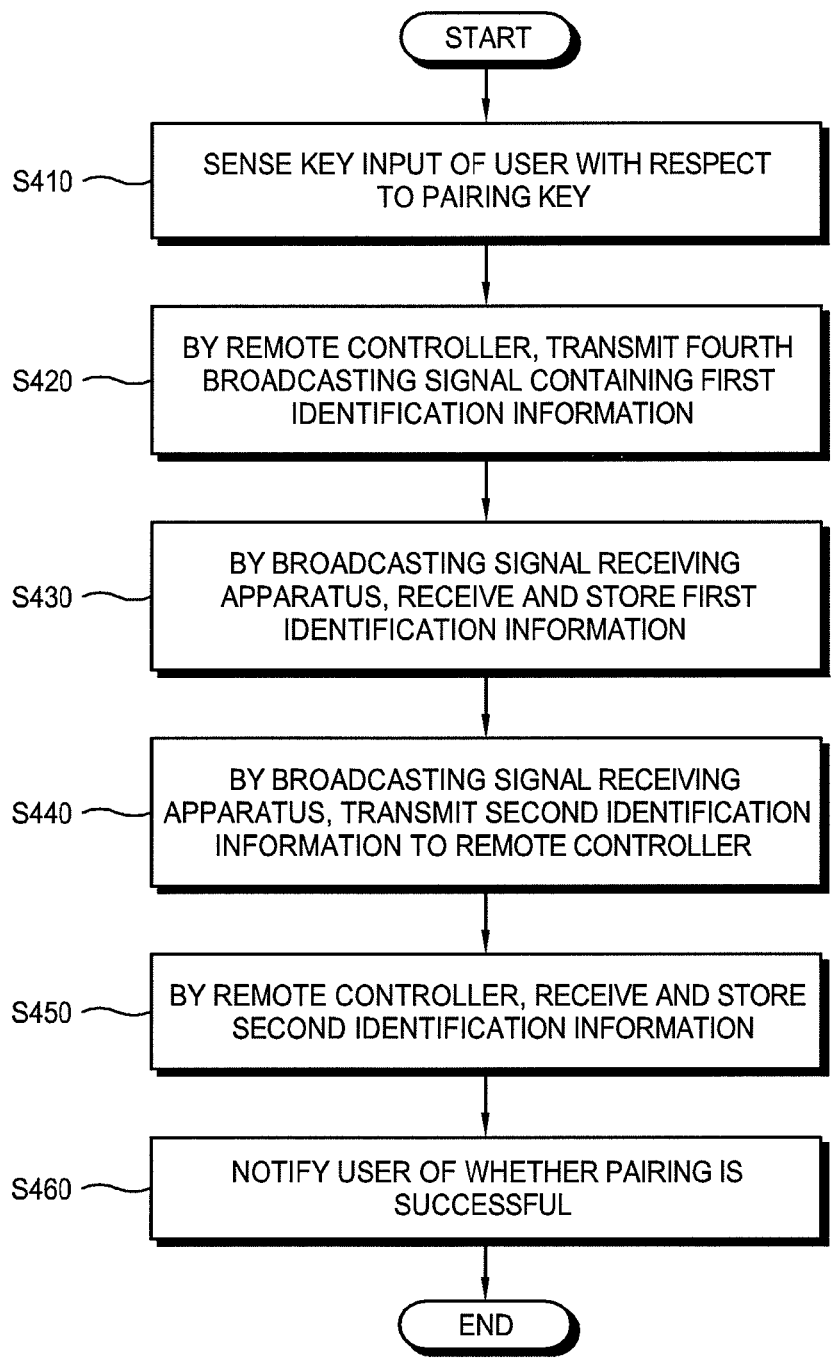
FIG. 9 is a flowchart of a pairing method for the broadcasting signal receiving apparatus and the remote controller according to a third exemplary embodiment of the present invention.

FIG. 9 is a flowchart of a pairing method for the broadcasting signal receiving apparatus 100 and the remote controller 200 according to a third exemplary embodiment of the present invention.

As shown in FIG. 9, at operation S410 the remote controller 200 may sense a user's key input corresponding to a pairing key provided in the second user input unit 230. Here, the remote controller 200 may sense a user's input about the pairing key regardless of the power-on/off state of the broadcasting signal receiving apparatus 100.

At operation S420, the remote controller 200 transmits the fourth broadcasting signal including the first identification information of the remote controller 200 to the broadcasting signal receiving apparatus 100 in response to the key input in the operation S410.

At operation S430, the broadcasting signal receiving apparatus 100 receives the fourth broadcasting signal transmitted in the operation S420 and stores the first identification information in the first storage unit 120 by monitoring whether the broadcasting signals corresponding to the plurality of transmission channels are received.

At operation S440, the broadcasting signal receiving apparatus 100 transmits the second identification information of the broadcasting signal receiving apparatus 100 to the remote controller 200 in response to the first identification information received in the operation S430.

At operation S450, the remote controller 200 receives the second identification information transmitted in the operation S440 and stores it in the second storage unit 220.

As results from performing the operations S410 to S450, at operation S460 the broadcasting signal receiving apparatus 100 or the remote controller 200 may notify a user of whether the pairing is successful or not through a display window, a sound, etc.

According to the foregoing exemplary embodiment of the present invention, the identification information for performing the RF communication is transmitted in response to a user's voluntary selection on the RF remote controller, so that a user who has no background of the pairing can conveniently use the RF remote controller without any complicated setup process.

In particular, the pairing mode may be automatically achieved by just a user's action of turning on the broadcasting signal receiving apparatus through the remote controller, thereby improving a user's convenience.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A pairing method of a remote controller performing bidirectional communication with an electronic apparatus, the pairing method comprising:
   sensing, by the remote controller, a key input for controlling the electronic apparatus, wherein the key input is selected from among a plurality of keys on the remote controller;
   if the key input is sensed by the remote controller, transmitting, by the remote controller, a broadcasting signal, in response to the sensed key input, including a control instruction to power on the electronic apparatus and first identification information of the remote controller to the electronic apparatus; and
   storing, by the remote controller, second identification information of the electronic apparatus received from the electronic apparatus to perform the pairing.

2. The pairing method of the remote controller according to claim 1, wherein the broadcasting signal is transmitted to a plurality of transmission channels being monitored by the electronic apparatus.

3. The pairing method of the remote controller according to claim 2, wherein the plurality of transmission channels are in a band for wireless local area network (WLAN) channels.

4. The pairing method of the remote controller according to claim 1, wherein the electronic apparatus includes a personal area network identifier (PAN ID) and the broadcasting signal includes the PAN ID of the electronic apparatus.

5. The pairing method of the remote controller according to claim 1, further comprising:
   notifying, by the electronic apparatus, that pairing is successful by displaying notification information on a display.

6. A pairing method of a remote controller performing bidirectional communication with an electronic apparatus, the pairing method comprising:
   sensing, by the remote controller, a key input for controlling the electronic apparatus, wherein the key input is selected from among a plurality of keys on the remote controller;
   transmitting, by the remote controller, a first signal, in response to the sensed key input, including the control instruction to power on the electronic apparatus;
   if the key input is sensed by the remote controller, transmitting, by the remote controller, a second signal, in response to the sensed key input, including the first identification information of the remote controller to the electronic apparatus; and
   storing, by the remote controller, second identification information of the electronic apparatus received from the electronic apparatus to perform the pairing.

7. The pairing method of the remote controller according to claim 6, wherein the first signal and the second signal comprise broadcasting signals transmitted to a plurality of transmission channels being monitored by the electronic apparatus.

8. The pairing method of the remote controller according to claim 7, wherein the plurality of transmission channels are in a band for wireless local area network (WLAN) channels.

9. The pairing method of the remote controller according to claim 6, wherein the electronic apparatus includes a personal area network identifier (PAN ID) and the broadcasting signal includes the PAN ID of the electronic apparatus.

10. A system comprising:
   a remote controller; and
   an electronic apparatus configured to bidirectionally communicate with the remote controller,
   wherein, if the remote controller senses a key input for controlling the electronic apparatus, the remote controller is configured to transmit a broadcasting signal, in response to the sensed key input, including a control instruction to power on the electronic apparatus and first identification information of the remote controller to the electronic apparatus, and
   the electronic apparatus is configured to monitor whether a broadcasting signal is received by periodically measuring a power of a signal related to a plurality of transmission channels, to perform a function based on the control instruction included in the broadcasting signal if the broadcasting signal is received, to store first identification information in a storage unit, and to transmit second identification information of the electronic apparatus to the remote controller.

11. The system according to claim 10, wherein the broadcasting signal is transmitted to a plurality of transmission channels being monitored by the electronic apparatus.

12. The system according to claim 11, wherein the plurality of transmission channels are in a band for wireless local area network (WLAN) channels.

13. The system according to claim 10, wherein the electronic apparatus includes a personal area network identifier (PAN ID) and the broadcasting signal includes the PAN ID of the electronic apparatus.

14. The system according to claim 10, the electronic apparatus is configured to notify that pairing is successful by displaying notification information on a display.

15. A remote controller comprising:
- a communication unit configured to bidirectionally communicate with an electronic apparatus;
- a user input unit which includes a plurality of function keys;
- a storage unit which stores first identification information of the remote controller; and
- a controller configured to control the communication unit to transmit a broadcasting signal including a control instruction to power on the electronic apparatus and first identification information if a key input is sensed, and to store second identification information of the electronic apparatus received therefrom in the storage unit.

16. An electronic apparatus comprising:
- a communication unit which bidirectionally communicates with a remote controller;
- a storage unit which stores second identification information of the electronic apparatus; and
- a controller which monitors whether a broadcasting signal is received over any of a plurality of transmission channels, performs a function based on a control instruction included in the broadcasting signal if the broadcasting signal is received, stores first identification information of the remote controller in the storage unit, and controls the communication unit to transmit the second identification information to the remote controller,
- wherein the monitoring of whether the broadcasting signal is received includes periodically measuring a power of a signal related to the plurality of transmission channels by standby power if the electronic apparatus is in a power-off state.

17. The electronic apparatus according to claim 16, wherein the broadcasting signal comprises a control instruction to power on the electronic apparatus.

18. The electronic apparatus according to claim 16, wherein the controller monitors the plurality of transmission channels to determine whether the broadcasting signal is received over any of the plurality of transmission channels.

* * * * *